US011952490B2

(12) United States Patent
Kang et al.

(10) Patent No.: US 11,952,490 B2
(45) Date of Patent: Apr. 9, 2024

(54) POLYCARBONATE RESIN COMPOSITION AND MOLDED ARTICLE CONTAINING THE SAME

(71) Applicants: HYUNDAI MOBIS CO., LTD., Seoul (KR); LG CHEM, LTD., Seoul (KR)

(72) Inventors: Hyoung Taek Kang, Yongin-si (KR); Keun Hyung Lee, Yongin-si (KR); Young Min Kim, Jeonbuk (KR); Moo Seok Lee, Jeonbuk (KR); Myeung Il Kim, Jeonbuk (KR); Jae Chan Park, Jeonbuk (KR)

(73) Assignees: HYUNDAI MOBIS CO., LTD., Seoul (KR); LG CHEM, LTD., Seoul (KR)

( * ) Notice: Subject to any disclaimer, the term of this patent is extended or adjusted under 35 U.S.C. 154(b) by 0 days.

(21) Appl. No.: 17/386,048

(22) Filed: Jul. 27, 2021

(65) Prior Publication Data
US 2022/0033651 A1 Feb. 3, 2022

(30) Foreign Application Priority Data
Jul. 28, 2020 (KR) .................. 10-2020-0093926

(51) Int. Cl.
*C08L 69/00* (2006.01)
*C08K 5/00* (2006.01)
*C08L 25/14* (2006.01)

(52) U.S. Cl.
CPC ............ *C08L 69/00* (2013.01); *C08K 5/0041* (2013.01); *C08K 5/005* (2013.01); *C08L 25/14* (2013.01); *C08L 2203/30* (2013.01)

(58) Field of Classification Search
CPC ....... C08L 25/14; C08L 69/00; C08K 5/0041; C08K 5/08; C08K 5/005
See application file for complete search history.

(56) References Cited

U.S. PATENT DOCUMENTS

| 3,945,979 A | * | 3/1976 | Kobayashi | ........... C08K 5/0041 524/611 |
| 4,434,072 A | * | 2/1984 | Imahori | ............... C09K 19/603 252/299.1 |
| 2004/0138381 A1 | * | 7/2004 | Blasius, Jr. | ............. C08L 63/10 525/131 |
| 2004/0189764 A1 | * | 9/2004 | Aono | .................... C09D 11/101 347/100 |
| 2007/0082989 A1 | * | 4/2007 | Glasgow | ................ C08K 5/109 524/284 |
| 2011/0184102 A1 | | 7/2011 | Kim et al. | |

FOREIGN PATENT DOCUMENTS

| CN | 106317820 A | 1/2017 |
| CN | 110709470 A | 1/2020 |
| DE | 603 12 482 T2 | 6/2007 |
| EP | 3 395 875 A1 | 10/2018 |
| KR | 10-2009-0059060 A | 6/2009 |

OTHER PUBLICATIONS

Office Action issued in corresponding Chinese Patent Application No. 202110858856.2 dated Dec. 5, 2022.
Office Action issued in corresponding German Patent Application No. 10 2021 119 497.0 dated Jan. 26, 2023.

* cited by examiner

*Primary Examiner* — Callie E Shosho
*Assistant Examiner* — Krupa Shukla
(74) *Attorney, Agent, or Firm* — MORGAN, LEWIS & BOCKIUS LLP

(57) ABSTRACT

The present disclosure relates to a polycarbonate resin composition, and more particularly, to a polycarbonate resin composition containing 90 wt % to 99 wt % of a polycarbonate resin, 0.3 wt % to 0.7 wt % of an anthraquinone-based black dye, and 0.2 wt % to 1.0 wt % of an acrylic polymeric chain extender, and a molded article containing the same.

19 Claims, No Drawings

POLYCARBONATE RESIN COMPOSITION AND MOLDED ARTICLE CONTAINING THE SAME

CROSS-REFERENCE TO RELATED APPLICATION

This application claims the benefit of priority to Korean Patent Application No. 10-2020-0093926, filed in the Korean Intellectual Property Office on Jul. 28, 2020, the entire contents of which are incorporated herein by reference.

TECHNICAL FIELD

The present disclosure relates to a polycarbonate resin composition, and more particularly, to a polycarbonate resin composition for molding a molded article that may be used as an automobile part that requires both a high transmittance for a near-infrared ray and an ability to block visible light at the same time, and a molded article containing the same.

BACKGROUND

With a recent development of an automobile industry, convenience devices for convenience of a driver and safety devices for a driving environment are continuously being developed.

Examples of the convenience device may include an autonomous driving device. For autonomous driving, an automobile needs to recognize a surrounding terrain during the autonomous driving. For this purpose, a LiDAR is being introduced. The Lidar is a technology of measuring a time it takes for light to return after aiming pulsed laser at a target object and an intensity of the light. For terrain mapping used in the autonomous driving of the automobile, an electromagnetic wave in a near-infrared ray region is used. Therefore, a transmittance for a near-infrared ray is important for a sensor having the LiDAR embedded therein and installed in the automobile.

In addition, as an example of the safety device, there may be a driver state warning (DSW) capable of preventing an accident resulted from negligence of the driver. The DSW is a system that monitors how much the driver concentrates on driving and gives a warning with sound and vibration when a level of attention is low and it is determined to be dangerous. Such DSW observes a state of the driver using an infrared camera mounted inside a dashboard of the automobile. Therefore, the transmittance for the near-infrared ray is also important for the DSW installed in the automobile.

In one example, a polycarbonate resin is amorphous and has excellent mechanical and thermal properties as a thermoplastic resin. In particular, the polycarbonate resin has high impact resistance at a room temperature, has excellent thermal stability, has excellent dimensional stability, and has a high transmittance because the polycarbonate resin is transparent.

Accordingly, the polycarbonate resin capable of penetrating the near-infrared ray, which has been used for a cover of a remote controller for home, a security CCTV, and the like, is considered as a material to be applied for a cover of the Lidar, the DSW, and the like. However, the polycarbonate resin is not durable enough to be applied as a material for the automobile continuously exposed to harsh environments such as light, moisture, heat, and the like. In addition, because visibility of inner parts of the cover is high, the polycarbonate resin is not suitable to be used as the material for the automobile. In addition, it is difficult for the polycarbonate resin to secure the transmittance for the near-infrared ray high enough to be used for the LiDAR and the DSW.

PRIOR ART LITERATURE

Patent Literature (Patent Document 1) KR10-2009-0059060A

SUMMARY

The present disclosure has been made to solve the above-mentioned problems occurring in the prior art while advantages achieved by the prior art are maintained intact.

An aspect of the present disclosure is to secure a high transmittance for a near-infrared ray and an ability to block visible light at the same time for a molded article that may be used as an automobile part using an electromagnetic wave in a near-infrared ray region like a LiDAR, a DSW, and the like.

Another aspect of the present disclosure provides a polycarbonate resin composition for molding a molded article that may secure a high transmittance for a near-infrared ray and an ability to block visible light at the same time.

Another aspect of the present disclosure provides a molded article that may be used as an automobile part using an electromagnetic wave in a near-infrared ray region like a LiDAR, a DSW, and the like by being molded from a polycarbonate resin composition to secure a high transmittance for a near-infrared ray and an ability to block visible light at the same time.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a polycarbonate resin composition contains 90 wt % to 99 wt % of a polycarbonate resin, 0.3 wt % to 0.7 wt % of an anthraquinone-based black dye, and 0.2 wt % to 1.0 wt % of an acrylic polymeric chain extender.

According to another aspect of the present disclosure, a molded article contains the polycarbonate resin composition.

DETAILED DESCRIPTION

Hereinafter, the present disclosure will be described in more detail to help understand the present disclosure.

Terms or words used in the present specification and claims should not be construed as being limited to conventional or dictionary meanings, and should be interpreted as a meaning and concept consistent with the technical idea of the present disclosure based on the principle that the inventor may appropriately define the concept of a term to describe his invention in the best way.

The present disclosure provides a polycarbonate resin composition for molding a molded article that may secure a high transmittance for a near-infrared ray and an ability to block visible light at the same time.

According to one embodiment of the present disclosure, the polycarbonate resin composition may contain 90 wt % to 99 wt % of a polycarbonate resin, 0.3 wt % to 0.7 wt % of an anthraquinone-based black dye, and 0.2 wt % to 1.0 wt % of an acrylic polymeric chain extender.

According to one embodiment of the present disclosure, the polycarbonate resin may include a repeating unit represented by Chemical Formula 1 below.

[Chemical Formula 1]

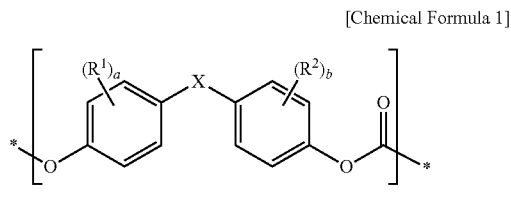

In Chemical Formula 1, each of $R^1$ and $R^2$ may independently represent hydrogen, an alkyl group having 1 to 10 carbon atoms, an alkoxy group having 1 to 10 carbon atoms, or a halogen group. Each of a and b may independently represent an integer selected from 0 to 4. When the a or the b is an integer equal to or higher than 2, the $R^1$ and the $R^2$ may be different from each other. X may be an alkylene group having 1 to 10 carbon atoms unsubstituted or substituted with an alkyl group or a phenyl group having 1 to 10 carbon atoms, a cycloalkylene group having 3 to 15 carbon atoms unsubstituted or substituted with an alkyl group or a phenyl group having 1 to 10 carbon atoms, O, S, SO, $SO_2$, or CO. As a specific example, each of the $R^1$ and the $R^2$ may independently represent the hydrogen, a methyl group, a chloro group, or a bromo group. In addition, as a specific example, the X may be the alkylene group having 1 to 10 carbon atoms unsubstituted or substituted with the alkyl group or the phenyl group having 1 to 10 carbon atoms. As a more specific example, the X may be methylene, ethane-1,1-diyl, propane-2,2-diyl, butane-2,2-diyl, 1-phenylethane-1,1-diyl, or diphenylmethylene. In addition, preferably, Z may be cyclohexane-1,1-diyl, O, S, SO, $SO_2$, or CO.

According to one embodiment of the present disclosure, the repeating unit represented by Chemical Formula 1 may be formed by a reaction between an aromatic diol compound and a carbonate precursor. As a specific example, the repeating unit represented by Chemical Formula 1 may be formed by a reaction between the carbonate precursor and the aromatic diol compound, which is at least one selected from a group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis (4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl) propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane. The reaction may mean a reaction between a hydroxyl group of the aromatic diol compound and the carbonate precursor.

According to one embodiment of the present disclosure, the carbonate precursor may be at least one selected from a group consisting of dimethyl carbonate, diethyl carbonate, dibutyl carbonate, dicyclohexyl carbonate, diphenyl carbonate, ditoryl carbonate, bis(chlorophenyl) carbonate, di-m-cresyl carbonate, dinaphthyl carbonate, bis(diphenyl) carbonate, phosgene, triphosgene, diphosgene, bromophosgene, and bishaloformate, and may be the triphosgene or the phosgene as a specific example.

According to one embodiment of the present disclosure, the repeating unit represented by Chemical Formula 1 may be a repeating unit represented by Chemical Formula 1-1 below.

[Chemical Formula 1-1]

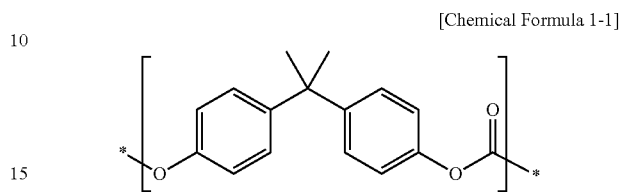

In addition, according to one embodiment of the present disclosure, the polycarbonate resin may have a weight average molecular weight (Mw) in a range from 20,000 g/mol to 80,000 g/mol. In a specific example, the weight average molecular weight (Mw) may be in a range from 40,000 g/mol to 80,000 g/mol, in a range from 50,000 g/mol to 80,000 g/mol, in a range from 60,000 g/mol to 80,000 g/mol, or in a range from 65,000 g/mol to 75,000 g/mol. Within such range, the high transmittance for the near-infrared ray and the ability to block the visible light may be secured at the same time while preventing deterioration of mechanical properties and thermal stability.

According to one embodiment of the present disclosure, the polycarbonate resin may be contained in the polycarbonate resin composition in an amount in a range from 90 wt % to 99 wt %, in a range from 95 wt % to 99 wt %, or in a range from 98 wt % to 99 wt %. Within such range, the high transmittance for the near-infrared ray and the ability to block the visible light may be secured at the same time while preventing the deterioration of the mechanical properties and the thermal stability.

According to one embodiment of the present disclosure, the anthraquinone-based black dye may include at least one selected from a group consisting of an anthraquinone-based compound containing a hydroxyl group and an anthraquinone-based compound containing an amino group. As a specific example, the anthraquinone-based black dye may include the anthraquinone-based compound containing the hydroxyl group and the anthraquinone-based compound containing the amino group. In this case, the high transmittance for the near-infrared ray and the ability to block the visible light may be secured at the same time.

According to one embodiment of the present disclosure, the anthraquinone-based compound containing the hydroxyl group and the anthraquinone-based compound containing the amino group may be contained in a weight ratio in a range from 5:1 to 1:5, in a range from 3:1 to 1:3, or in a range from 2:1 to 1:2. Within such range, the high transmittance for the near-infrared ray and the ability to block the visible light may be secured at the same time.

According to one embodiment of the present disclosure, the anthraquinone-based black dye may have a melting point in a range from 150° C. to 160° C., in a range from 153° C. to 158° C., or in a range from 155° C. to 158° C. Within such range, the high transmittance for the near-infrared ray and the ability to block the visible light may be secured at the same time.

According to one embodiment of the present disclosure, the anthraquinone-based black dye may have a solubility in water at 25° C. in a range from 0.001 mg/L to 0.005 mg/L, in a range from 0.0015 mg/L to 0.0035 mg/L, or in a range from 0.002 mg/L to 0.003 mg/L. Within such range, the high transmittance for the near-infrared ray and the ability to block the visible light may be secured at the same time.

According to one embodiment of the present disclosure, the anthraquinone-based black dye may be contained in the polycarbonate resin composition in an amount in a range from 0.3 wt % to 0.7 wt %, in a range from 0.3 wt % to 0.6 wt %, or in a range from 0.3 wt % to 0.5 wt %. Within such range, the high transmittance for the near-infrared ray and the ability to block the visible light may be secured at the same time while preventing the deterioration of the mechanical properties and the thermal stability.

According to one embodiment of the present disclosure, the acrylic polymeric chain extender may be an acrylic polymeric chain extender including an aromatic vinyl-based monomer unit and an acrylate-based monomer unit, and may be a styrene-acrylic polymeric chain extender as a specific example. As another example, the acrylic polymeric chain extender may be an epoxy-modified acrylic polymeric chain extender.

According to one embodiment of the present disclosure, the acrylic polymeric chain extender may have a weight average molecular weight in a range from 5,000 g/mol to 50,000 g/mol, in a range from 5,000 g/mol to 30,000 g/mol, in a range from 5,000 g/mol to 20,000 g/mol, in a range from 5,000 g/mol to 10,000 g/mol, or in a range from 6,500 g/mol to 7,500 g/mol. Within such range, the high transmittance for the near-infrared ray and the ability to block the visible light may be secured at the same time while preventing the deterioration of the mechanical properties and the thermal stability.

According to one embodiment of the present disclosure, the acrylic polymeric chain extender may have a glass transition temperature in a range from 50° C. to 70° C., in a range from 55° C. to 65° C., or in a range from 55° C. to 60° C. Within such range, the high transmittance for the near-infrared ray and the ability to block the visible light may be secured at the same time while preventing the deterioration of the mechanical properties and the thermal stability.

According to one embodiment of the present disclosure, the acrylic polymeric chain extender may have an epoxy equivalent weight in a range from 100 g/mol to 1,000 g/mol, in a range from 200 g/mol to 600 g/mol, or in a range from 250 g/mol to 400 g/mol. Within such range, the high transmittance for the near-infrared ray and the ability to block the visible light may be secured at the same time while preventing the deterioration of the mechanical properties and the thermal stability.

According to one embodiment of the present disclosure, the acrylic polymeric chain extender may be contained in the polycarbonate resin composition in an amount in a range from 0.2 wt % to 1.0 wt %, in a range from 0.2 wt % to 0.8 wt %, or in a range from 0.2 wt % to 0.5 wt %. Within such range, the high transmittance for the near-infrared ray and the ability to block the visible light may be secured at the same time while preventing the deterioration of the mechanical properties and the thermal stability.

In addition, according to one embodiment of the present disclosure, the polycarbonate resin composition may contain at least one additive selected from a group consisting of a heat stabilizer, a lubricant, and a UV stabilizer in a residual amount as necessary in addition to the polycarbonate resin, the anthraquinone-based black dye, and the acrylic polymeric chain extender.

The present disclosure provides a molded article containing the polycarbonate resin composition. The molded article may be molded from the polycarbonate resin composition.

According to one embodiment of the present disclosure, the molded article may have a transmittance for an electromagnetic wave having a wavelength in a range from 870 nm to 950 nm at an incident angle of 0° equal to or higher than 89%, in a range from 89% to 100%, or in a range from 89% to 95% in a thickness range from 1 mm to 3 mm. When using the molded article within such range as an automobile part using an electromagnetic wave in a near-infrared ray region like a LiDAR, a DSW, and the like, the high transmittance for the near-infrared ray may be secured.

According to one embodiment of the present disclosure, the molded article may have a transmittance for an electromagnetic wave having the wavelength in the range from 870 nm to 950 nm at an incident angle of 40° equal to or higher than 86%, in a range from 86% to 100%, or in a range from 86% to 95% in the thickness range from 1 mm to 3 mm. When using the molded article within such range as the automobile part using the electromagnetic wave in the near-infrared ray region like the LiDAR, the DSW, and the like, the high transmittance for the near-infrared ray may be secured even in a wide incident angle region.

In addition, according to one embodiment of the present disclosure, the molded article may have a deviation of the transmittance for the electromagnetic wave having the wavelength in the range from 870 nm to 950 nm at an incidence angle in a range from 0 and 40 equal to or lower than 2.5%, in a range from 0.1% to 2.5%, or in a range from 0.1% to 2.2% in the thickness range from 1 mm to 3 mm. When using the molded article within such range as the automobile part using the electromagnetic wave in the near-infrared ray region like the LiDAR, the DSW, and the like, the high transmittance for the near-infrared ray may be secured even in the wide incident angle region.

According to one embodiment of the present disclosure, the molded article may block an electromagnetic wave having a wavelength equal to or lower than 780 nm, equal to or lower than 782 nm, or equal to or lower than 786 nm in the thickness range from 1 mm to 3 mm. When using the molded article within such range as the automobile part using the electromagnetic wave in the near-infrared ray region like the LiDAR, the DSW, and the like, visibility of an interior of the part by visible light transmission is lowered. In this connection, a wavelength range in which the electromagnetic wave is blocked may be a visible light wavelength range, and the lowering of the electromagnetic wave in the wavelength range described above may mean that a transmittance for the electromagnetic wave in the wavelength range described above is lower than 50%. The transmittance may be a transmittance for an entire incident angle range from 0° to 90°.

According to one embodiment of the present disclosure, the molded article may have an amount of change (before exposure-after exposure) of the transmittance for the electromagnetic wave having the wavelength in the range from 870 nm to 990 nm at the incident angle of 0° equal to or lower than ±2.0%, equal to or lower than ±1.5%, or equal to or lower than ±1.2% when being exposed at 80° C. for 300 hours in the thickness range from 1 mm to 3 mm. Within such range, as heat aging resistance is excellent, durability against harsh environments is excellent.

According to one embodiment of the present disclosure, the molded article may have the amount of change (before exposure-after exposure) of the transmittance for the electromagnetic wave having the wavelength in the range from 870 nm to 990 nm at the incident angle of 0° equal to or lower than ±2.0%, equal to or lower than ±1.5%, or equal to or lower than ±1.0% when being exposed to following steps (S1), (S2), and (S3) three times in a sequential and repeated manner in the thickness range from 1 mm to 3 mm. Within such range, as heat cycle resistance is excellent, the durability against the harsh environments is excellent.

(S1) 3 hours at a surface temperature in a range from 70° C. to 100° C., (S2) 3 hours at an ambient temperature of −40° C., and (S3) 7 hours at an ambient temperature of 50° C. and a relative humidity of 90%.

According to one embodiment of the present disclosure, the molded article may have the amount of change (before exposure-after exposure) of the transmittance for the electromagnetic wave having the wavelength in the range from 870 nm to 990 nm at the incident angle of 0° equal to or lower than ±3.0%, equal to or lower than ±2.5%, or equal to or lower than ±2.0% when being exposed to a cumulative light intensity of 1,050 kJ/m² in the thickness range from 1 mm to 3 mm. Within such range, as light resistance is excellent, the durability against the harsh environments is excellent.

According to one embodiment of the present disclosure, the molded article may have a color difference ΔE based on color coordinates ($L^*_0$, $a^*_0$, $b^*_0$) of a CIE LAB color space before the exposure and color coordinates ($L^*_A$, $a^*_A$, $b^*_A$) of the CIE LAB color space after the exposure satisfying Mathematical Equation 1 below when being exposed to the cumulative light intensity of 1,050 kJ/m² in the thickness range from 1 mm to 3 mm. Within such range, as light resistance is excellent, the durability against the harsh environments is excellent.

$$\Delta E \leq 2.0 \quad \text{[Mathematical Equation 1]}$$

According to one embodiment of the present disclosure, the molded article may have a specific gravity in a range from 1.17 to 1.23, in a range from 1.17 to 1.20, or in a range from 1.18 to 1.19, measured based on an ASTM D792.

According to one embodiment of the present disclosure, the molded article may have a tensile strength measured at a crosshead speed of 50 mm/min at a thickness of 3.2 mm based on an ASTM D638 equal to or greater than 55 MPa, equal to or greater than 60 MPa, or in a range from 65 MPa to 80 MPa, may have an elongation rate measured at a crosshead speed of 50 mm/min at a thickness of 3.2 mm based on an ASTM D638 equal to or higher than 140%, equal to or higher than 142%, or in a range from 142% to 150%, may have a flexural strength equal to or greater than 87 MPa, in a range from 87 MPa to 100 MPa, or in a range from 87 MPa to 90 MPa measured at a crosshead speed of 10 mm/min at a thickness of 6.4 mm based on an ASTM D790, and may have a flexural modulus equal to or greater than 1,900 MPa, in a range from 2,000 MPa to 3,000 MPa, or in a range from 2,100 MPa to 2,200 MPa measured at a crosshead speed of 10 mm/min at a thickness of 6.4 mm based on an ASTM D790. Within such range, the mechanical properties for use in the automobile part using the electromagnetic wave in the near-infrared ray region may be secured.

In addition, according to one embodiment of the present disclosure, the light transmissive molded article may have an impact strength measured at 23° C. for a notched specimen with a 6.4 mm thickness based on an ASTM D256 equal to or higher than 85 J/m, in a range from 85 KJ/m to 100 J/m, in a range from 85 J/m to 95 J/m, or in a range from 85 J/m to 90 J/m. Within such range, the mechanical properties for use in the automobile part using the electromagnetic wave in the near-infrared ray region may be secured.

In addition, according to one embodiment of the present disclosure, the light transmissive molded article may have a heat deflection temperature measured by heating at a speed of 120° C./h with a load of 18.6 kgf/cm² at a thickness of 6.4 mm based on an ASTM D648 equal to or higher than 120° C., in a range from 120° C. to 140° C., in a range from 125° C. to 135° C., or in a range from 125° C. to 130° C. Within such range, the mechanical properties for use in the automobile part using the electromagnetic wave in the near-infrared ray region may be secured.

According to one embodiment of the present disclosure, the molded article may have a transmittance for an electromagnetic wave having a wavelength in a range from 380 nm to 700 nm at the incident angle of 0° equal to or lower than 2.0%, equal to or lower than 1.0%, equal to or lower than 0.5%, or equal to or lower than 0.1% in the thickness range from 1 mm to 3 mm. Within such range, the ability to block the visible light suitable for the use in the automobile part using the electromagnetic wave in the near-infrared ray region is excellent. Each range with the term "equal to or lower than" is meant to include a transmittance of 0%.

According to one embodiment of the present disclosure, the molded article may have a reflectance of the electromagnetic wave having the wavelength in the range from 380 nm to 700 nm at the incident angle of 0° equal to or lower than 6%, equal to or lower than 5.5%, or in a range from 0.1% to 5.5% in the thickness of 1 mm to 3 mm. Within such range, the ability to block the visible light suitable for the use in the automobile part using the electromagnetic wave in the near-infrared ray region is excellent.

According to one embodiment of the present disclosure, when being exposed at 95° C. for 1,000 hours in the thickness range from 1 mm to 3 mm, the molded article may have an amount of change (before exposure-after exposure) of the transmittance for the electromagnetic wave having the wavelength in the range from 380 nm to 700 nm at the incident angle of 0° equal to or lower than ±2.0%, equal to or lower than ±1.5%, or equal to or lower than ±1.0%, and may have an amount of change (before exposure-after exposure) of the reflectance of the electromagnetic wave having the wavelength in the range from 380 nm to 700 nm at the incident angle of 0° equal to or lower than ±2.0%, equal to or lower than ±1.5%, or equal to or lower than ±1.0%. In addition, the molded article may have an amount of change (before exposure-after exposure) of a transmittance for an electromagnetic wave having a wavelength in a range from 930 nm to 1,600 nm at the incident angle of 0° equal to or lower ±2.0%, equal to or lower than ±1.5%, or equal to or lower than ±1.0%. Within such range, as heat resistance is excellent, the durability against the harsh environments is excellent.

According to one embodiment of the present disclosure, when being exposed following steps (S10) and (S20) 36 times in a sequential and repeated manner in the thickness range from 1 mm to 3 mm, the molded article may have the amount of change (before exposure-after exposure) of the transmittance for the electromagnetic wave having the wavelength in the range from 380 nm to 700 nm at the incident angle of 0° equal to or lower than ±2.0%, equal to or lower than ±1.5%, or equal to or lower than ±1.0%, and may have the amount of change (before exposure-after exposure) of the reflectance of the electromagnetic wave having the wavelength in the range from 380 nm to 700 nm at the incident angle of 0° equal to or lower than ±2.0%, equal to or lower than ±1.5%, or equal to or lower than ±1.0%. In addition, the molded article may have the amount of change (before exposure-after exposure) of the transmittance for the electromagnetic wave having the wavelength in the range from 930 nm to 1,600 nm at the incident angle of 0° equal to or lower ±2.0%, equal to or lower than ±1.5%, or equal to or lower than ±1.0%. Within such range, as the heat cycle resistance is excellent, the durability against the harsh environments is excellent.

(S10) 1 hour at 40° C., (S20) 1 hour at 90° C.

According to one embodiment of the present disclosure, when being exposed at −30° C. for 500 hours in the thickness range from 1 mm to 3 mm, the molded article may have the amount of change (before exposure-after exposure) of the transmittance for the electromagnetic wave having the wavelength in the range from 380 nm to 700 nm at the incident angle of 0° equal to or lower than ±2.0%, equal to or lower than ±1.5%, or equal to or lower than ±1.0%, and may have the amount of change (before exposure-after exposure) of the reflectance of the electromagnetic wave having the wavelength in the range from 380 nm to 700 nm at the incident angle of 0° equal to or lower than ±2.0%, equal to or lower than ±1.5%, or equal to or lower than ±1.0%. In addition, the molded article may have the amount of change (before exposure-after exposure) of the transmittance for the electromagnetic wave having the wavelength in the range from 930 nm to 1,600 nm at the incident angle of 0° equal to or lower ±2.0%, equal to or lower than ±1.5%, or equal to or lower than ±1.0%. Within such range, as cold resistance is excellent, the durability against the harsh environments is excellent.

According to one embodiment of the present disclosure, when being exposed at 65° C. and a relative humidity of 90% for 500 hours in the thickness range from 1 mm to 3 mm, the molded article may have the amount of change (before exposure-after exposure) of the transmittance for the electromagnetic wave having the wavelength in the range from 380 nm to 700 nm at the incident angle of 0° equal to or lower than ±2.0%, equal to or lower than ±1.5%, or equal to or lower than ±1.0%, and may have the amount of change (before exposure-after exposure) of the reflectance of the electromagnetic wave having the wavelength in the range from 380 nm to 700 nm at the incident angle of 0° equal to or lower than ±2.0%, equal to or lower than ±1.5%, or equal to or lower than ±1.0%. In addition, the molded article may have the amount of change (before exposure-after exposure) of the transmittance for the electromagnetic wave having the wavelength in the range from 930 nm to 1,600 nm at the incident angle of 0° equal to or lower ±2.0%, equal to or lower than ±1.5%, or equal to or lower than ±1.0%. Within such range, as moisture resistance is excellent, the durability against the harsh environments is excellent.

According to one embodiment of the present disclosure, when being exposed to the cumulative light intensity of 1,050 kJ/m² in the thickness range from 1 mm to 3 mm, the molded article may have the amount of change (before exposure-after exposure) of the transmittance for the electromagnetic wave having the wavelength in the range from 380 nm to 700 nm at the incident angle of 0° equal to or lower than ±2.0%, equal to or lower than ±1.5%, or equal to or lower than ±1.0%, and may have the amount of change (before exposure-after exposure) of the reflectance of the electromagnetic wave having the wavelength in the range from 380 nm to 700 nm at the incident angle of 0° equal to or lower than ±2.0%, equal to or lower than ±1.5%, or equal to or lower than ±1.0%. In addition, the molded article may have the amount of change (before exposure-after exposure) of the transmittance for the electromagnetic wave having the wavelength in the range from 930 nm to 1,600 nm at the incident angle of 0° equal to or lower ±5.0%, equal to or lower than ±3.0%, or equal to or lower than ±2.5%. Within such range, as the light resistance is excellent, the durability against the harsh environments is excellent.

According to one embodiment of the present disclosure, when being exposed to 99% ethanol at a room temperature for 24 hours in the thickness range from 1 mm to 3 mm, the molded article may have the amount of change (before exposure-after exposure) of the transmittance for the electromagnetic wave having the wavelength in the range from 380 nm to 700 nm at the incident angle of 0° equal to or lower than ±2.0%, equal to or lower than ±1.5%, or equal to or lower than ±1.0%, and may have the amount of change (before exposure-after exposure) of the reflectance of the electromagnetic wave having the wavelength in the range from 380 nm to 700 nm at the incident angle of 0° equal to or lower than ±2.0%, equal to or lower than ±1.5%, or equal to or lower than ±1.0%. In addition, the molded article may have the amount of change (before exposure-after exposure) of the transmittance for the electromagnetic wave having the wavelength in the range from 930 nm to 1,600 nm at the incident angle of 0° equal to or lower ±2.0%, equal to or lower than ±1.5%, or equal to or lower than ±1.0%. Within such range, as chemical resistance is excellent, the durability against the harsh environments is excellent.

According to one embodiment of the present disclosure, the molded article may include a coating layer on a surface on at least one side depending on an application purpose. The coating layer may be a coating layer formed from a urethane acrylate-based coating composition modified with a silicone-based compound. As a specific example, the coating layer may be a coating layer formed from a urethane acrylate-based coating composition modified with polydimethylsiloxane. The coating layer may be applied within a range that does not impair the transmittance and the property of blocking the visible light in the near-infrared ray wavelength region of the molded article. When the molded article includes the coating layer, durability such as weather resistance, scratch resistance, and the like is improved.

In addition, according to one embodiment of the present disclosure, a thickness of the coating layer may be equal to or lower than 10 μm, equal to or lower than 8 μm, or equal to or lower than 6 μm. Within such range, without impairing the transmittance and the property of blocking the visible light for the near-infrared ray wavelength region of the molded article, the durability such as the weather resistance, the scratch resistance, and the like is improved.

In addition, according to one embodiment of the present disclosure, the coating layer may be a coating layer formed by being cured by UV or thermal curing. Accordingly, the coating layer is easily formed.

According to one embodiment of the present disclosure, the molded article may be the automobile part. As a specific example, the molded article may be the automobile part using the electromagnetic wave in the near-infrared ray region like the LiDAR, the DSW, or the like. As a more specific example, the molded article may be a cover of the automobile part using the electromagnetic wave in the near-infrared ray region like the LiDAR, the DSW, or the like.

Hereinafter, Examples of the present disclosure will be described in detail such that a person having ordinary knowledge in the technical field to which the present disclosure belongs may easily implement the present disclosure. However, the present disclosure may be embodied in several different forms and may not be limited to the Examples described herein.

EXAMPLES

Examples 1 to 4 and Comparative Examples 1 to 7

The Polycarbonate resin, the dye, and the chain extender were formulated based on compositions shown in Table 1 below, and the heat stabilizer, the lubricant, and the UV stabilizer were added thereto as the additives and mixed therewith using a mixer to form mixtures. Pellets were prepared by melt-extruding the mixtures in a temperature range from 250° C. to 300° C. using a twin-screw extruder. After drying the prepared pellets at 100° C. for 4 hours or more, specimens having a thickness of 1.5 mm were injected and prepared.

Experimental Example 1

After leaving the specimens prepared in the Experimental Examples and Comparative Examples at a room temperature for 48 hours or more, HITACHI's UH4150 Spectrophotometer (Integrating Sphere) instrument was used to measure transmittances in the electromagnetic wave wavelength region at the incident angle of 0°. A visible light blocking wavelength region and transmittances of an electromagnetic wave (the near-infrared ray) having a wavelength of 950 nm are shown in Table 1 below.

In this connection, the visible light blocking wavelength region (with the transmittance lower than 50%) has to exhibit at least 780 nm to have an effect of lowering the visibility of the interior of the part by the visible light transmission. The higher the wavelength of the visible light blocking wavelength region, the better the effect.

In addition, the transmittance of the near-infrared ray wavelength region (in a range from 900 nm to 950 nm) has to exhibit at least 89.0% to secure the high transmittance for the near-infrared ray when the molded article is used as the automobile part using the electromagnetic wave in the near-infrared ray region like the LiDAR, the DSW, and the like. The higher the transmittance, the better the effect.

As shown in Table 1 above, in Examples 1 to 4 molded using polycarbonate resin compositions according to the present disclosure, it may be seen that, with a thickness of 1.5 mm, transmittances of the electromagnetic wave at the incident angle of 0° and the wavelength of 950 nm were equal to or higher than 89.3%, and electromagnetic waves with the wavelength equal to or lower than 780 nm were blocked.

On the other hand, in Comparative Examples 1 and 2, it may be seen that transmittances of the electromagnetic wave at the incident angle of 0° and the wavelength of 950 nm were reduced to be equal to or lower than 88.8% as the chain extender was not applied.

In addition, in Comparative Example 3, it may be seen that a transmittance of the electromagnetic wave at the incident angle of 0° and the wavelength of 950 nm was rather reduced to 88.9% even when the chain extender was added in excess.

In addition, in Comparative Examples 4 and 5, it may be seen that visible light blocking wavelength regions were lowered because a content of the dye was not sufficient. In addition, in Comparative Examples 6 and 7, it may be seen that transmittances of the electromagnetic wave at the incident angle of 0° and the wavelength of 950 nm were reduced because an excessive amount of dye was added.

Experimental Example 2

Based on the results for the visible light blocking ability and the near-infrared ray transmitting ability measured in Experimental Example 1, to determine whether the molded articles manufactured in Examples are suitable as the automobile part using the electromagnetic wave in the near-infrared ray region for the purpose of the present disclosure, after drying the pellet prepared in Example 1 at 100° C. for 4 hours or more, specimens of thicknesses of 1.0 mm, 2.0 mm and 3.0 mm were injected and prepared. Table 2 below shows a wavelength region (with a transmittance lower than 50%) where the visible light is blocked and transmittances of the electromagnetic wave (the near-infrared ray) with the wavelength of 950 nm at the incident angles of 0° and 40° for each thickness of the specimens.

TABLE 1

| Division | | Example | | | | Comparative Example | | | | | | |
|---|---|---|---|---|---|---|---|---|---|---|---|---|
| | | 1 | 2 | 3 | 4 | 1 | 2 | 3 | 4 | 5 | 6 | 7 |
| PC[1] | (wt %) | 98.5 | 98.4 | 98.3 | 98.0 | 98.5 | 98.4 | 97.3 | 98.6 | 98.3 | 98.0 | 97.7 |
| CO[2] | (wt %) | 0.3 | 0.4 | 0.5 | 0.5 | 0.3 | 0.4 | 0.5 | 0.2 | 0.2 | 0.8 | 0.8 |
| CE[3] | (wt %) | 0.2 | 0.2 | 0.2 | 0.5 | — | — | 1.2 | 0.2 | 0.5 | 0.2 | 0.5 |
| AD[4] | (wt %) | 1.0 | 1.0 | 1.0 | 1.0 | 1.2 | 1.2 | 1.0 | 1.0 | 1.0 | 1.0 | 1.0 |
| Visible light blocking wavelength range | (nm) | 780 | 782 | 786 | 786 | 780 | 782 | 784 | 776 | 776 | 783 | 783 |
| Transmittance of electromagnetic wave (near-infrared ray) with wavelength of 950 nm | (%) | 89.6 | 89.4 | 89.3 | 89.4 | 88.7 | 88.8 | 88.9 | 88.8 | 89.0 | 88.7 | 88.9 |

PC: polycarbonate resin (weight average molecular weight 69,200 g/mol)
CO: anthraquinone-based black dye (melting point 157° C., solubility of 0.0023 mg/L for water at 25° C.)
CE: styrene-acrylic polymeric chain extender (weight average molecular weight 7,250 g/mol, glass transition temperature 59° C.)
[4]AD: mixture of heat stabilizer (IR 1076, PEP-36), lubricant (PETS L348), and UV stabilizer (Tinuvin 234)

TABLE 2

| Division | | | Example 1 |
|---|---|---|---|
| Visible light blocking wavelength range | 1.0 mm | (nm) | 300~750 |
| | 2.0 mm | (nm) | 300~760 |
| | 3.0 mm | (nm) | 300~770 |
| Transmittance of electromagnetic wave (near-infrared ray) with wavelength of 950 nm (incident angle 0°) | 1.0 mm | (%) | 89.7 |
| | 2.0 mm | (%) | 89.6 |
| | 3.0 mm | (%) | 88.6 |
| Transmittance of electromagnetic wave (near-infrared ray) with wavelength of 950 nm (incident angle 40°) | 1.0 mm | (%) | 87.5 |
| | 2.0 mm | (%) | 87.4 |
| | 3.0 mm | (%) | 86.8 |

As shown in Table 2 above, it may be seen that the molded article molded using the polycarbonate resin composition according to the present disclosure exhibited the visible light blocking ability and the infrared light transmitting ability suitable for the use in the automobile part using the electromagnetic wave in the near-infrared ray region. In particular, it may be seen that a deviation of the transmittance of the electromagnetic wave with the wavelength of 950 nm at the incident angles of 0° and 40° was equal to or lower than 2.2%.

Experimental Example 3

After exposing the specimen with the thickness of 2.0 mm prepared in Experimental Example 2 to each condition using a following method, transmittances of the electromagnetic wave in the near-infrared ray wavelength region in a range from 910 nm to 990 nm with the incident angle of 0° are shown in Table 3 below.

Heat aging resistance: exposing the specimen at 80° C. for 300 hours

Heat cycle resistance: exposing the specimen to the steps (S1), (S2), and (S3) three times in the sequential and repeated manner (S1) 3 hours at the surface temperature in a range from 70° C. to 100° C., (S2) 3 hours at the ambient temperature of −40° C., and (S3) 7 hours at the ambient temperature of 50° C. and the relative humidity of 90%.

Light resistance: exposing the specimen to the cumulative light intensity of 1,050 kJ/m$^2$

TABLE 3

| Division (Example 1) | | Heat aging resistance | Heat cycle resistance | Light resistance |
|---|---|---|---|---|
| 910 nm | (%) | 89.1 | 89.8 | 89.0 |
| 920 nm | (%) | 89.8 | 89.5 | 89.7 |
| 930 nm | (%) | 90.2 | 90.0 | 90.1 |
| 940 nm | (%) | 90.2 | 90.0 | 90.0 |
| 950 nm | (%) | 90.3 | 90.1 | 90.2 |
| 960 nm | (%) | 89.9 | 89.7 | 90.0 |
| 970 nm | (%) | 90.0 | 90.0 | 90.2 |
| 980 nm | (%) | 90.3 | 90.2 | 90.4 |
| 990 nm | (%) | 90.0 | 89.6 | 89.7 |

As shown in Table 3 above, it may be seen that the molded article molded using the polycarbonate resin composition according to the present disclosure exhibited the infrared light transmitting ability suitable for the use in the automobile part using the electromagnetic wave in the near-infrared ray region even after being exposed to each condition.

Experimental Example 4

Based on the results for the visible light blocking ability and the near-infrared ray transmitting ability measured in Experimental Examples 1 to 3, to determine whether the molded articles manufactured in Examples are suitable as the automobile part using the electromagnetic wave in the near-infrared ray region for the purpose of the present disclosure, after drying the pellet prepared in Example 1 at 100° C. for 4 hours or more, each specimen of a thickness required in each measuring method was injected and prepared. The specific gravity, the tensile strength, the elongation rate, the flexural strength, the flexural modulus, the izod impact strength, the heat deflection temperature, the infrared light transmittance, the visible light transmittance, and the light resistance of the specimen were measured using following methods and shown in Table 4 below.

Specific gravity: measured based on the ASTM D792. The specific gravity must be in a range from 1.17 to 1.23 for the use in the automobile part using the electromagnetic wave in the near-infrared ray region based on the purpose of the present disclosure.

Tensile strength (MPa) and elongation rate (%): measured at the crosshead speed of 50 mm/min at the thickness of 3.2 mm based on the ASTM D638. The tensile strength must be equal to or higher than 55 MPa and the elongation rate must be equal to or higher than 140% for the use in the automobile part using the electromagnetic wave in the near-infrared ray region based on the purpose of the present disclosure.

Flexural strength (MPa) and flexural modulus (MPa): measured at the crosshead speed of 10 mm/min at the thickness of 6.4 mm based on the ASTM D790. The flexural strength must be equal to or higher than 87 MPa and the flexural modulus must be equal to or higher than 1,900 MPa for the use in the automobile part using the electromagnetic wave in the near-infrared ray region based on the purpose of the present disclosure.

Izod impact strength (J/m): measured at 23° C. for the notched specimen with the 6.4 mm thickness based on the ASTM D256. The izod impact strength must be equal to or higher than 85 J/m for the use in the automobile part using the electromagnetic wave in the near-infrared ray region based on the purpose of the present disclosure.

Heat deflection temperature (° C.): measured by the heating at the speed of 120° C./h with the load of 18.6 kgf/cm$^2$ at the thickness of 6.4 mm based on the ASTM D648. The heat deflection temperature must be equal to or higher than 120° C. for the use in the automobile part using the electromagnetic wave in the near-infrared ray region based on the purpose of the present disclosure.

Infrared light transmittance: A transmittance of the electromagnetic wave with the wavelength of 940 nm at the incident angle 0° was measured for each of the specimen with the thickness of 3.0 mm and the specimen with the thickness of 2.0 mm. The infrared light transmittance must be equal to or higher than 85% for the use in the automobile part using the electromagnetic wave in the near-infrared ray region based on the purpose of the present disclosure.

Visible light transmittance: A transmittance of the electromagnetic wave with the wavelength in the range from 380 nm to 700 nm at the incident angle 0° was measured for the specimen with the thickness of 2.0 mm. The visible light transmittance must be equal to or lower than 1% for the use in the automobile part using the electromagnetic wave in the near-infrared ray region based on the purpose of the present disclosure.

Light resistance: The specimen with the thickness of 2.0 mm was exposed to the cumulative light intensity of 1,050 kJ/m². Color coordinates of a CIE LAB color space of the specimen before and after the exposure were measured using a colorimeter. A color difference ΔE was calculated by measuring color coordinates ($L^*_A$, $a^*_A$, $b^*_A$) of the CIE LAB color space after the exposure compared to color coordinates ($L^*_0$, $a^*_0$, $b^*0$) of the CIE LAB color space before the exposure. The color difference must be equal to or lower than 2.0 for the use in the automobile part using the electromagnetic wave in the near-infrared ray region based on the purpose of the present disclosure.

TABLE 4

| Division | | Example 1 |
|---|---|---|
| Specific gravity | | 1.19 |
| Tensile strength | (MPa) | 70 |
| Elongation rate | (%) | 142 |
| Flexural strength | (MPa) | 87 |
| Flexural modulus | (MPa) | 2,120 |
| Izod impact strength | (J/m) | 89 |
| Heat deflection temperature | (° C.) | 129 |
| Infrared light transmittance (3.0 mm, 940 nm) | (%) | 89.4 |
| Infrared light transmittance (2.0 mm, 940 nm) | (%) | 89.8 |
| Visible light transmittance | (%) | 0 |
| Light resistance | ΔE | 0.08 |

As shown in Table 4 above, it may be seen that the molded article molded using the polycarbonate resin composition according to the present disclosure exhibited the properties suitable for the use in the automobile part using the electromagnetic wave in the near-infrared ray region even after being exposed to each condition.

Experimental Example 5

Based on the results for the visible light blocking ability and the near-infrared ray transmitting ability measured in Experimental Example 1 and the results for the properties measured in Experimental Example 3, to determine whether the molded articles manufactured in Examples are suitable as the automobile part using the electromagnetic wave in the near-infrared ray region for the purpose of the present disclosure, after drying the pellet prepared in Example 1 at 100° C. for 4 hours or more, the specimen of the thickness of 2.0 mm was injected and prepared. A transmittance of the electromagnetic wave in the wavelength range from 380 nm to 700 nm at the incidence angle of 0° (a visible light transmittance), a reflectance of the electromagnetic wave in the wavelength range from 380 nm to 700 nm at the incidence angle of 0° (a visible light reflectance), a transmittance of each wavelength range at the incidence angle of 0°, and a visible light blocking wavelength range (with the transmittance lower than 50%) of the specimen were measured and shown in Table 5 below.

The visible light transmittance must be equal to or lower than 2%, the visible light reflectance must be equal to or lower than 6%, a transmittance of an electromagnetic wave with a wavelength in a range from 930 nm to 940 nm, which is an infrared light region, must be equal to or higher than 60%, a transmittance of an electromagnetic wave with a wavelength in a range from 940 nm to 950 nm must be equal to or higher than 70%, and a transmittance of an electromagnetic wave with a wavelength in a range from 950 nm to 1,600 nm must be equal to or higher than 80% for the use in the automobile part using the electromagnetic wave in the near-infrared ray region based on the purpose of the present disclosure.

TABLE 5

| Division | | | Example 1 |
|---|---|---|---|
| Visible light transmittance | | (%) | 0 |
| Visible light reflectance | | (%) | 5.4 |
| Infrared light transmittance | 930 nm~940 nm | (%) | 88.8 |
| | 940 nm~950 nm | (%) | 88.8 |
| | 950 nm~1,600 nm | (%) | 86.8 |
| Visible light blocking wavelength range | | (nm) | 780 |

As shown in Table 5 above, it may be seen that the molded article molded using the polycarbonate resin composition according to the present disclosure exhibited the visible light blocking ability and the infrared light transmitting ability suitable for the use in the automobile part using the electromagnetic wave in the near-infrared ray region.

Experimental Example 6

Based on the results for the visible light blocking ability and the near-infrared ray transmitting ability measured in Experimental Example 5, to determine whether the molded articles manufactured in Examples are suitable as the automobile part using the electromagnetic wave in the near-infrared ray region for the purpose of the present disclosure, after drying the pellet prepared in Example 1 at 100° C. for 4 hours or more, the specimen of the thickness of 2.0 mm was injected and prepared, and exposed to each condition using a following method. The transmittance of the electromagnetic wave in the wavelength range from 380 nm to 700 nm at the incidence angle of 0° (the visible light transmittance), the reflectance of the electromagnetic wave in the wavelength range from 380 nm to 700 nm at the incidence angle of 0° (the visible light reflectance), and the transmittance of each wavelength range at the incidence angle of 0° of the specimen were measured and shown in Table 6 below.

Heat resistance: exposing the specimen at 95° C. for 1,000 hours

Thermal shock cycle: exposing the specimen to the steps (S10) and (S20) 36 times in the sequential and repeated manner (S10) 1 hour at 40° C., (S20) 1 hour at 90° C.

Cold resistance: exposing the specimen at −30° C. for 500 hours

Moisture resistance: exposing the specimen at 65° C. and 90% relative humidity for 500 hours Light resistance: exposing the specimen to the cumulative light intensity of 1,050 kJ/m²

Chemical resistance: exposing the specimen to 99% ethanol at the room temperature for 24 hours

TABLE 6

| Division (Example 1) | | | Heat resistance | Thermal shock cycle | Cold resistance | Moisture resistance | Light resistance | Chemical resistance |
|---|---|---|---|---|---|---|---|---|
| Visible light transmittance | | (%) | 0 | 0 | 0 | 0 | 0 | 0 |
| Visible light reflectance | | (%) | 5.4 | 5.4 | 5.4 | 5.4 | 5.4 | 5.4 |
| Infrared light transmittance | 930 nm~940 nm | (%) | 88.7 | 88.7 | 88.6 | 88.7 | 89.8 | 88.8 |
| | 940 nm~950 nm | (%) | 88.7 | 88.7 | 88.6 | 88.8 | 90.1 | 88.8 |
| | 950 nm~1,600 nm | (%) | 86.7 | 86.6 | 86.6 | 86.6 | 89.3 | 86.8 |

As shown in Table 6 above, it may be seen that the molded article molded using the polycarbonate resin composition according to the present disclosure exhibited the visible light blocking ability and the infrared light transmitting ability suitable for the use in the automobile part using the electromagnetic wave in the near-infrared ray region even after being exposed to each condition.

It may be seen from such results that the molded article molded from the polycarbonate resin composition according to the present disclosure is able to be used for the automobile part using the electromagnetic wave in the near-infrared ray region like the LiDAR, the DSW, and the like as the high transmittance for the near-infrared ray and the ability to block the visible light may be secured at the same time.

The molded article molded from the polycarbonate resin composition according to the present disclosure may secure both the high transmittance for the near-infrared ray and the ability to block the visible light at the same time.

Accordingly, the automobile part manufactured from the molded article according to the present disclosure is useful as the automobile part using the electromagnetic wave in the near-infrared ray region like the LiDAR, the DSW, and the like, particularly as a cover.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A polycarbonate resin composition containing:
   90 wt % to 99 wt % of a polycarbonate resin having a weight average molecular weight in a range from 20,000 g/mol to 80,000 g/mol;
   0.3 wt % to 0.5 wt % of an anthraquinone-based black dye having a melting point in a range from 150 ° C. to 160 ° C., and a solubility in water at 25 ° C. in a range from 0.001 mg/L to 0.005 mg/L; and
   0.2 wt % to 1.0 wt % of an acrylic polymeric chain extender having a weight average molecular weight in a range from 5,000 g/mol to 50,000 g/mol and a glass transition temperature in a range from 50 ° C. to 70 ° C.

2. The polycarbonate resin composition of claim 1, further containing:
   at least one additive selected from a group consisting of a heat stabilizer, a lubricant, and a UV stabilizer in a residual amount.

3. The polycarbonate resin composition of claim 1, wherein the anthraquinone-based black dye comprises an anthraquinone-based compound containing a hydroxy group and an anthraquinone-based compound containing an amino group in a weight ratio of 5:1 to 1:5.

4. The polycarbonate resin composition of claim 1, wherein the anthraquinone-based black dye comprises an anthraquinone-based compound containing a hydroxy group and an anthraquinone-based compound containing an amino group in a weight ratio of 3:1 to 1:3.

5. The polycarbonate resin composition of claim 1, wherein the anthraquinone-based black dye comprises an anthraquinone-based compound containing a hydroxy group and an anthraquinone-based compound containing an amino group in a weight ratio of 2:1 to 1:2.

6. The polycarbonate resin composition of claim 1, wherein the polycarbonate resin includes a repeating unit represented by Chemical Formula 1 below:

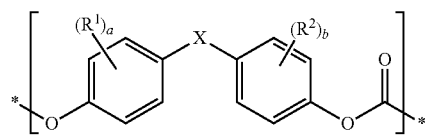

Formula 1 wherein, in Formula 1,
each of $R^1$ and R2 independently represents hydrogen, an alkyl group having 1 to 10 carbon atoms, an alkoxy group having 1 to 10 carbon atoms, or a halogen group,
each of a and b independently represents an integer selected from 0 to 4,
X is an alkylene group having 1 to 10 carbon atoms unsubstituted or substituted with an alkyl group or a phenyl group having 1 to 10 carbon atoms, a cycloalkylene group having 3 to 15 carbon atoms unsubstituted or substituted with an alkyl group or a phenyl group having 1 to 10 carbon atoms, O, S, SO, $SO_2$, or CO.

7. The polycarbonate resin composition of claim 6, wherein, in Formula 1, $R^1$ and R2 independently represents hydrogen, a methyl group, a chloro group, or a bromo group.

8. The polycarbonate resin composition of claim 6, wherein, in Formula 1, X is methylene, ethane-1,1-diyl, propane-2,2-diyl, butane-2,2-diyl, 1-phenylethane-1,1- diyl, or diphenylmethylene.

9. The polycarbonate resin composition of claim 6, wherein the repeating unit represented by Chemical Formula 1 is a repeating unit represented by Chemical Formula 1-1:

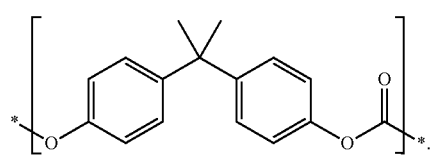

10. The polycarbonate resin composition of claim 1, wherein the acrylic polymeric chain extender comprises an aromatic vinyl-based monomer unit and an acrylate-based monomer unit.

11. The polycarbonate resin composition of claim 1, wherein the acrylic polymeric chain extender comprises a styrene-acrylic polymeric chain extender.

12. The polycarbonate resin composition of claim 1, wherein the acrylic polymeric chain extender comprises an epoxy-modified acrylic polymeric chain extender.

13. The polycarbonate resin composition of claim 1, wherein the polycarbonate resin composition comprises 98.0 wt % to 98.5 wt % of the polycarbonate resin.

14. The polycarbonate resin composition of claim 1, wherein the polycarbonate resin composition comprises 0.2 wt % to 0.5 wt % of the acrylic polymeric chain extender.

15. A molded article containing the polycarbonate resin composition of claim 1.

16. The molded article of claim 15, wherein the molded article has a transmittance, for an electromagnetic wave having a wavelength in a range from 870 nm to 950 nm at an incident angle of 0°, equal to or higher than 89% in a thickness range from 1 mm to 3 mm.

17. The molded article of claim 15, wherein the molded article has a transmittance, for an electromagnetic wave having a wavelength in a range from 870 nm to 950 nm at an incident angle of 40°, higher than or equal to 86% in a thickness range from 1 mm to 3 mm.

18. The molded article of claim 15, wherein the molded article has a deviation of a transmittance, for an electromagnetic wave having a wavelength in a range from 870 nm to 950 nm at an incidence angle in a range from 0° and 40°, lower than or equal to 2.5% in a thickness range from 1 mm to 3 mm.

19. The molded article of claim 15, wherein the molded article blocks electromagnetic waves with a wavelength lower than or equal to 780 nm in a thickness range from 1 mm to 3 mm.

* * * * *